(12) United States Patent
Persson et al.

(10) Patent No.: US 10,577,756 B2
(45) Date of Patent: Mar. 3, 2020

(54) ECCENTRIC SHAFT FOR A COMPACTION MACHINE

(71) Applicant: Dynapac Compaction Equipment AB, Karlskrona (SE)

(72) Inventors: Andreas Persson, Karlskrona (SE); Hans Christensen, Karlskrona (SE)

(73) Assignee: Dynapac Compaction Equipment AB (SE)

( * ) Notice: Subject to any disclaimer, the term of this patent is extended or adjusted under 35 U.S.C. 154(b) by 0 days.

(21) Appl. No.: 16/097,064

(22) PCT Filed: Apr. 26, 2017

(86) PCT No.: PCT/SE2017/050408
§ 371 (c)(1),
(2) Date: Oct. 26, 2018

(87) PCT Pub. No.: WO2017/188884
PCT Pub. Date: Nov. 2, 2017

(65) Prior Publication Data
US 2019/0145060 A1    May 16, 2019

(30) Foreign Application Priority Data

Apr. 29, 2016 (SE) ...................................... 1600149

(51) Int. Cl.
*E01C 19/28* (2006.01)
*F16C 3/18* (2006.01)

(52) U.S. Cl.
CPC .............. *E01C 19/286* (2013.01); *F16C 3/18* (2013.01); *F16C 2350/00* (2013.01)

(58) Field of Classification Search
CPC ................................ E01C 19/286; F16C 3/18
See application file for complete search history.

(56) References Cited

U.S. PATENT DOCUMENTS

| | | | | | |
|---|---|---|---|---|---|
| 4,836,758 | A | * | 6/1989 | Elson | F01C 1/0215 384/271 |
| 5,857,388 | A | * | 1/1999 | Killion | F16F 15/264 123/192.2 |
| 6,516,679 | B2 | * | 2/2003 | Yates | B06B 1/164 404/117 |
| 6,644,860 | B2 | * | 11/2003 | Fuchida | F16C 19/466 384/569 |
| 8,157,451 | B2 | * | 4/2012 | Solfrank | F16C 19/46 384/457 |
| 8,206,061 | B1 | * | 6/2012 | Hansen | E01C 19/286 404/128 |
| 9,394,939 | B2 | * | 7/2016 | Wemhoener | F16C 19/546 |

(Continued)

FOREIGN PATENT DOCUMENTS

SE         537044 C2    10/2014

*Primary Examiner* — Abigail A Risic
(74) *Attorney, Agent, or Firm* — Condo Roccia Koptiw LLP

(57) ABSTRACT

An eccentric shaft (1) for a compaction machine comprising at least one pair of straight circular cylindrical bearing seats (2,3) arranged on either side of a center of gravity (TP) of the eccentric shaft (1). The bearing seats (2,3) are arranged such that cylinder axes (4, 5) thereof approximately intersect or cross each other at a concave angle (V), less than 179.8 degrees, towards the center of gravity (TP) when the eccentric shaft (1) is at rest.

6 Claims, 1 Drawing Sheet

(56) References Cited

U.S. PATENT DOCUMENTS

2012/0183423 A1     7/2012    Couto et al.
2014/0133909 A1     5/2014    Hansen et al.
2015/0139731 A1     5/2015    Persson et al.

\* cited by examiner

US 10,577,756 B2

ECCENTRIC SHAFT FOR A COMPACTION MACHINE

CROSS REFERENCE TO RELATED APPLICATIONS

This application is the National Stage Entry under 35 U.S.C. § 371 of Patent Cooperation Treaty Application No. PCT/SE2017/050408, filed Apr. 26, 2017, which claims priority from Sweden Application No. 1600149-7, filed Apr. 29, 2016, the disclosure of which is hereby incorporated by reference in its entirety.

TECHNICAL FIELD

The invention relates to the design of eccentric shafts for compaction machines, such as road rollers and vibrator plates. The eccentric shafts are rotatably connected via bearings to rollers/bottom plates of the road rollers/vibrator plates and are intended to cause them to vibrate when the shafts are caused to rotate at an appropriate operating speed. The eccentric shafts assume a slightly curved shape during the rotational operation due to the effect of centrifugal force on the eccentrically displaced center of gravity on of the shaft. The bent shape causes an unwanted inclination of bearing seats of the eccentric shaft.

PRIOR ART

In the American patent U.S. Pat. No. 8,206,061 an eccentric shaft is disclosed which is optimized with respect to (low) moment of inertia. The shaft comprises an I-shaped section to counteract the tendency of the shaft to bend during rotational operation. In the Swedish patent SE 53 704, a tendency of an easy-to-start eccentric shaft to bend is limited by a calculated consideration of bending stress in a most heavily loaded portion of the shaft. Thus, inclination of bearings of the eccentric shaft becomes manageable, but it would be advantageous if the inclination could be minimized or eliminated completely. Bending of the known eccentric shaft and inclination of bearing seats thereof are illustrated in FIGS. 1-2 of the present application.

OBJECT OF THE INVENTION

The object of the present invention is to obtain an eccentric shaft where inclination at the bearings is almost eliminated when the shaft is rotating during operation.

BRIEF SUMMARY OF THE INVENTION

The present invention achieves this object in that the eccentric shaft is provided with a calculated shape change which results in that bearing seats of the shaft are straightened when the shaft is rotating during operation. In a compaction machine this is rendered possible by means of an eccentric shaft comprising at least one pair of straight circular cylindrical bearing seats arranged on either side of a center of gravity of the eccentric shaft, wherein the bearing seats are arranged such that cylinder axes thereof approximately intersect or cross each other at a concave angle, less than 179.8 degrees, towards the center of gravity when the eccentric shaft is at rest.

Preferably, the cylinder axes of the bearing seats approximately intersect, wherein the center of gravity lies approximately in a plane determined by the intersecting cylinder axes.

Alternatively, the cylinder axes of the bearing seats cross each other, wherein center of gravity lies approximately in a plane determined by one of the cylinder axes and an intersecting line in parallel with the other of the cylinder axes.

Preferably, the angle is greater than 178 degrees, and more preferably greater than 179 degrees.

In summary, the present invention provides embodiments where inclination at the bearings is almost eliminated. The invention is particularly suitable for slender eccentric shafts which are designed to provide a low moment of inertia in order to be easy to start.

BRIEF DESCRIPTION OF THE DRAWINGS

The invention will be described in detail with reference to the accompanying FIGS. 1-4.

DETAILED DESCRIPTION OF PREFERRED EMBODIMENTS

Figure 1:
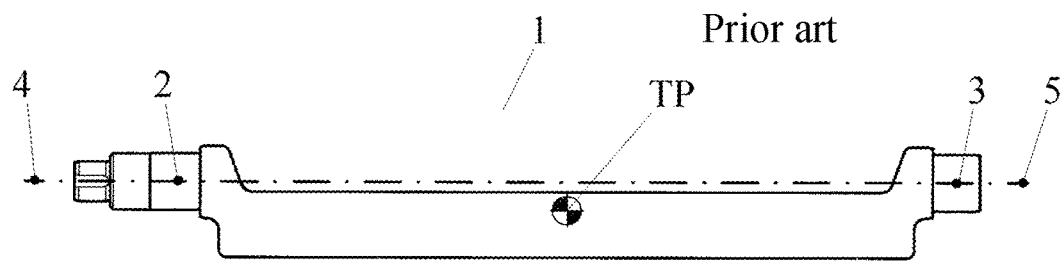
FIG. 1 shows a previously known eccentric shaft when it is at rest.

FIG. 1 shows a prior art eccentric shaft 1, comprising a pair of circular cylindrical bearing seats 2, 3 arranged on either side of a center of gravity TP of the eccentric shaft 1. The position description "either side" refers in this context to positions along the longitudinal dimension of the eccentric shaft 1. The bearing seats 2, 3 define cylinder axes 4 and 5, respectively, which axes approximately coincide according to theoretical intentions. However, in series production of eccentric shafts 1, the cylinder axes 4, 5 will randomly coincide, cross each other and intersect as a result of normal deviations. The center of gravity TP is somewhat radially offset from the coinciding cylinder axes 4, 5 to give the eccentric shaft 1 an eccentric action when it is rotating.

Figure 2:
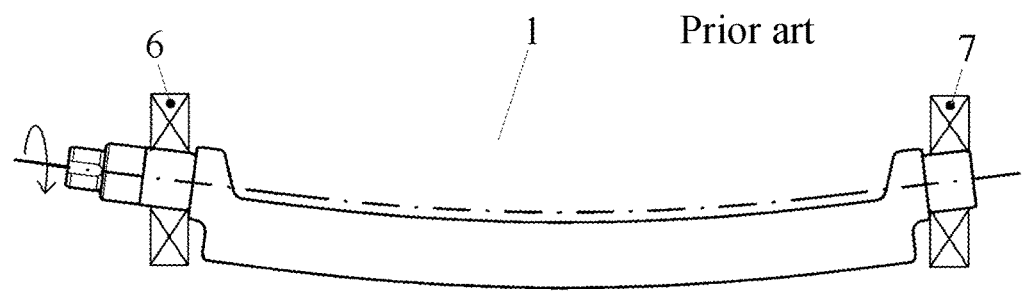
FIG. 2 shows the known eccentric shaft of FIG. 1 when rotating during operation.

FIG. 2 shows how the known eccentric shaft 1 of FIG. 1 bends when the shaft 1 is rotating. The eccentric shaft 1 is connected via a shaft coupling to a drive motor (not shown) which drivingly rotates the eccentric shaft 1. The bending is extremely exaggerated in the figure to illustrate the phenomenon. Bearings 6, 7 are adapted to cater for the axial displacement that occurs when the eccentric shaft 1 bends. The bent shape also causes an undesired inclination at the bearings 6, 7 of the eccentric shaft 1. It is fully possible to arrange the bearings 6, 7 so that they can handle inclination, but often inclination causes increased thermal stress and shortened length of service of bearings 6, 7.

Figure 3:
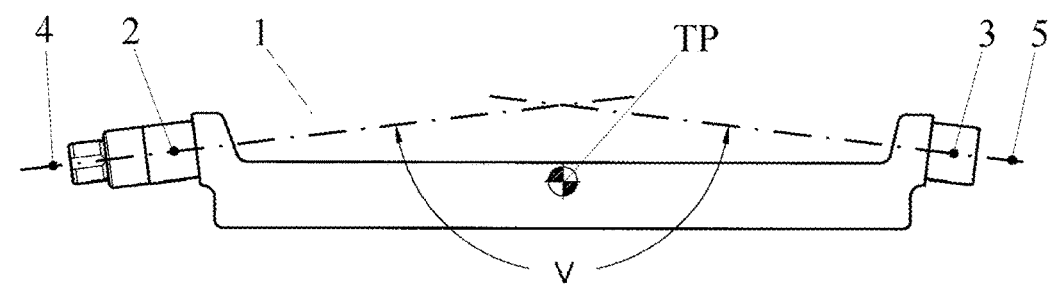
FIG. 3 shows an eccentric shaft made according to the present invention, in a view across its longitudinal dimension and when the shaft is at rest.

FIG. 3 shows a first embodiment of an eccentric shaft 1 according to the present invention. The eccentric shaft 1 has the same performance and is driven and journalled in the same way as the eccentric shaft 1 in FIG. 1-2. The eccentric shaft 1 comprises a pair of circular cylindrical bearing seats 2, 3 arranged on either side of the center of gravity TP of the eccentric shaft 1. The bearing seats 2, 3 define cylinder axes 4 and 5, respectively. The bearing seats 2, 3 are arranged such that their cylinder axes 4, 5 approximately intersect and in such a way that the center of gravity TP lies approximately in a plane determined by the intersecting cylinder axes 4, 5. The bearing seats 2, 3 are also arranged in such a manner that their cylinder axes 4, 5 intersect at a somewhat concave angle V towards the center of gravity TP. The concavity is strongly exaggerated in the figure.

As mentioned earlier in connection with FIG. 1, normal deviations in series production and randomness can cause a concave angle V. However, such eccentric shafts do not provide any noticeable or significant technical effect, such as the effect aimed at in the present application. It is unlikely that even the most wide-ranging production tolerance would lead to concave angles V less than 179.8 degrees. Claim 1 of the present application does therefore exclude eccentric shafts which exhibit concave angles of 179.8 degrees or greater.

The angle V is 179.4 degrees and is determined by a theoretical calculation of an angular change at the bearing seats 2, 3 when the eccentric shaft 1 is rotating. The bearing seats 2, 3 are in this case calculated to tilt 0.3 degrees during rotational operation and the angle V is therefore determined to be 180−0.3−0.3=179.4 degrees. Accordingly, the start of the eccentric shaft 1 will occur while the bearing seats 2, 3 incline 0.3 degrees each. The previously mentioned shaft coupling will therefore be imposed a small wobbling motion during start of the eccentric shaft 1. However, it is of course possible to find shaft couplings capable of starting with angles V down to 179 degrees or to use other types of coupling arrangements that can handle starts with angles down to 178 degrees. The term "approximately", as used above, refers in this context to deviations normally found as a result of more or less wide-ranging production tolerances. In the above-described first embodiment, it is assumed that the eccentric shaft 1 is produced to the strictest possible tolerances. This provides the best prerequisites for achieving the advantages of the invention. For wider production tolerances, or for other reasons, it appears better to describe the cylinder axes 4, 5 as crossing each other. Even such a second embodiment of the invention provides good conditions for achieving the advantages of the invention. The angle V and the above-mentioned plane are in that case determined by the angle between one of the cylinder axes 4, 5 and an intersecting line in parallel with the other of the cylinder axes 4, 5. The eccentric shaft 1 is most conveniently made of cast iron or cast steel and its bearing seats 2, 3 and arrangements for coupling connections, are machined by a multi-operation machine or the like. It is also possible, but not recommended, to bend the eccentric shaft 1 to arrive at the angle V. It is also possible to shape the central portion of the eccentric shaft slightly bent (instead of straight) to thus provide for and guarantee the desired shape change during rotational operation.

Figure 4:
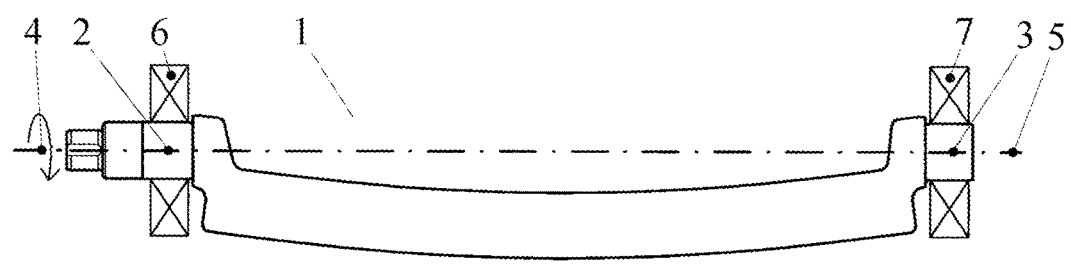
FIG. 4 shows the eccentric shaft of FIG. 3 when rotating during operation.

FIG. 4 shows how the calculated shape change during rotational operation of the eccentric shaft 1 results in bending of the shaft 1 and the expected straightening of its bearing seats 2, 3. Rotational operation thus results in an addition of 0.3+0.3 degrees to the 179.4 degrees depicted in FIG. 3. The alignment of the bearing seats 2, 3 and the corresponding cylinder axes 4, 5 causes the axes 4, 5 to approximately coincide with a rotational center axis around which the rotational operation takes place. The bearings 6, 7 will thus be loaded under ideal conditions since inclination of the bearing seats 2, 3 is almost eliminated when the eccentric shaft 1 is rotating.

When interpreting the claims of the present application, it is important to note that known eccentric shafts that exhibit the above-described concave angles due to unintentional deformation due to transport damage, breakdown or the like are to be disregarded.

The invention claimed is:

1. An eccentric shaft for a compaction machine, the eccentric shaft comprising:
at least one pair of straight circular cylindrical bearing seats arranged on either side of a center of gravity (TP) of the eccentric shaft , the bearing seats defining multiple cylinder axes, wherein the bearing seats are arranged such that the multiple cylinder axes approximately intersect or cross each other at a concave angle (V) towards the center of gravity (TP) when the eccentric shaft is at rest, the angle (V) being less than 179.8 degrees.

2. The eccentric shaft according to claim 1, wherein the center of gravity (TP) lies approximately in a plane comprising at least one of the multiple cylinder axes.

3. The eccentric shaft according to claim 1, wherein the multiple cylinder axes intersect each other and the center of gravity (TP) lies approximately in a plane determined by the intersecting cylinder axes.

4. The eccentric shaft according to claim 1, wherein the angle (V) is greater than 178 degrees.

5. The eccentric shaft according to claim 1, wherein the angle (V) is greater than 179 degrees.

6. The eccentric shaft according to claim 1, wherein the bearing seats define two cylinder axes each associated with a respective one of the bearing seats.

* * * * *